United States Patent
Sampath et al.

(10) Patent No.: US 8,830,885 B2
(45) Date of Patent: Sep. 9, 2014

(54) MULTICHANNEL ARCHITECTURE FOR HIGH THROUGHPUT MODEMS

(75) Inventors: Hemanth Sampath, San Diego, CA (US); Vincent K. Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 12/482,880

(22) Filed: Jun. 11, 2009

(65) Prior Publication Data

US 2010/0046487 A1 Feb. 25, 2010

Related U.S. Application Data

(60) Provisional application No. 61/090,843, filed on Aug. 21, 2008.

(51) Int. Cl.
*H04B 7/00* (2006.01)
*H04L 5/00* (2006.01)
*H04W 88/08* (2009.01)

(52) U.S. Cl.
CPC ............ *H04L 5/0023* (2013.01); *H04L 5/0037* (2013.01); *H04L 5/0033* (2013.01); *H04W 88/08* (2013.01)
USPC ........................................................ 370/310

(58) Field of Classification Search
None
See application file for complete search history.

(56) References Cited

U.S. PATENT DOCUMENTS

| | | | |
|---|---|---|---|
| 5,673,259 A | 9/1997 | Quick, Jr. | |
| 6,128,276 A * | 10/2000 | Agee | 370/208 |
| 6,201,801 B1 * | 3/2001 | Dent | 370/342 |
| 6,611,231 B2 * | 8/2003 | Crilly et al. | 342/378 |
| 7,023,871 B2 * | 4/2006 | Lind et al. | 370/437 |
| 7,096,042 B2 * | 8/2006 | Marinier | 455/562.1 |
| 7,509,146 B2 * | 3/2009 | Leabman | 455/562.1 |
| 8,515,435 B2 * | 8/2013 | Krasny et al. | 455/450 |
| 2003/0086362 A1 * | 5/2003 | Hasegawa et al. | 370/201 |
| 2003/0202537 A1 * | 10/2003 | Rogerson et al. | 370/478 |
| 2004/0062221 A1 | 4/2004 | Gopalakrishnan et al. | |
| 2004/0095907 A1 * | 5/2004 | Agee et al. | 370/334 |
| 2004/0127168 A1 * | 7/2004 | Ito | 455/82 |
| 2005/0255815 A1 | 11/2005 | Hammerschmidt et al. | |
| 2006/0176973 A1 * | 8/2006 | Alamouti et al. | 375/267 |
| 2007/0002797 A1 * | 1/2007 | Lai | 370/331 |
| 2008/0095121 A1 * | 4/2008 | Shattil | 370/335 |

(Continued)

FOREIGN PATENT DOCUMENTS

| JP | 11505392 | 5/1999 |
|---|---|---|
| JP | 2000275327 A | 10/2000 |

(Continued)

OTHER PUBLICATIONS

International Search Report and Written Opinion—PCT/US2009/054259, International Search Authority—European Patent Office—Sep. 3, 2010.

(Continued)

*Primary Examiner* — Fan Ng
(74) *Attorney, Agent, or Firm* — Eric Ho

(57) ABSTRACT

An apparatus for wireless communications is disclosed herein that is configured to have a plurality of transceivers arranged to process a plurality of spatial streams, wherein each of the plurality of transceivers is configured to operate asynchronously and simultaneously with other transceivers of the plurality of transceivers.

55 Claims, 6 Drawing Sheets

(56) References Cited

U.S. PATENT DOCUMENTS

| | | | |
|---|---|---|---|
| 2008/0212526 A1* | 9/2008 | Oyman | 370/329 |
| 2009/0016372 A1* | 1/2009 | Tao et al. | 370/437 |
| 2009/0180403 A1* | 7/2009 | Tudosoiu | 370/278 |
| 2009/0296674 A1* | 12/2009 | Ekl et al. | 370/338 |
| 2010/0002620 A1* | 1/2010 | Proctor et al. | 370/315 |

FOREIGN PATENT DOCUMENTS

| | | |
|---|---|---|
| JP | 2005333640 A | 12/2005 |
| JP | 2006060386 A | 3/2006 |
| WO | WO2004057776 | 7/2004 |

OTHER PUBLICATIONS

Huawei: "Physical layer technologies for LTE-Advanced", 3GPP TSG RAN WG1#53, R1-081838, May 9, 2008.

LG Electronics, Inc: "On the Consideration of Technical Candidates for LTE-advanced", 3GPP TSG RAN WG1#53, R1-081809, May 9, 2008.

Ibata, K., et al., "An m-Derived Ladder Filter using Acoustic Wave Resonator", Technical Report of the Institute of Electronics, Information and Communication Engineers, Feb. 14, 2003, vol. 102, No. 655, pp. 43-48, US2002-120.

Sato, T., et al., "An Experiment on MIMO System having Polarization Antenna at BS", Proceedings of the 2007 IEICE General Conference, Communications 1, Mar. 7, 2007, p. 445, B-5-31.

Taiwan Search Report—TW098128271—TIPO—Jan. 21, 2014.

Uchida, D., et al., "Antenna Configuration using Directivity and Orthogonal Polarization in the Indoor MIMO Systems Assuming the Wireless LAN", Technical Report of the Institute of Electronics, Information and Communication Engineers, Jan. 16, 2008, vol. 107, No. 431, pp. 51-56, A.P2007-131.

* cited by examiner

400

| Frequency | Channel Number | Transmit Frequency | Maximum Transmit Power | Potential Radar |
|---|---|---|---|---|
| U-NII lower band | 40 | 5.200 GHz | 40mW | No |
| | 36 | 5.180 GHz | | |
| | 44 | 5.220 GHz | | |
| | 48 | 5.240 GHz | | |
| U-NII middle band | 52 | 5.260 GHz | 200mW | |
| | 56 | 5.280 GHz | | |
| | 60 | 5.300 GHz | | |
| | 64 | 5.320 GHz | | |
| Middle-Upper band | ~12 channels | 5.475-5.725 GHz | ? | Yes |
| U-NII upper band | 149 | 5.745 GHz | 800mW | |
| | 153 | 5.765 GHz | | |

FIG. 4

MULTICHANNEL ARCHITECTURE FOR HIGH THROUGHPUT MODEMS

CROSS-REFERENCE TO RELATED APPLICATION

Claim of Priority Under 35 U.S.C. §119

The present Application for Patent claims priority to Provisional Application No. 61/090,843 entitled "MULTI-CHANNEL ARCHITECTURE FOR 802.11 VERY HIGH THROUGHPUT MODEMS" filed Aug. 21, 2008, and assigned to the assignee hereof and hereby expressly incorporated by reference herein.

BACKGROUND

I. Field

The following description relates generally to communication systems, and more particularly to a multichannel architecture for high throughput modems.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

Next generation WLAN are targeting data rates that are over one (1) Gigabits per second (Gbps). One of the key enabling technologies is "multi-channel transmission," which is aimed to increase the bandwidth to multiple channels and thereby improve throughput. Unlike other systems, achieving "multi-channel transmission" is not straightforward for several reasons. For example, devices may need to operate in asynchronous fashion in different channels, and the channels may become "de-sensed" in receive mode as a result of transmissions on the channels that are in transmit mode. Specifically, in some cases, the transmit signal in the transmit channel of the modem can be more than 100 dB stronger compared to the received signal in the received channel of the modem. Such a strong transmit signal can saturate the front-end of the receiver in the same modem, and cause non-linearities, thereby degrading the signal quality at the receiver. Another concern with multichannel modems is that the transmitted signal can become "aliased" into the received signal after analog to digital (ADC) conversion. This aliasing can degrade the signal quality at the receiver.

Consequently, it would be desirable to address one or more of the deficiencies described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods that provide wireless communication, where an apparatus for communications is configured to have a plurality of transceivers arranged to process a plurality of spatial streams, wherein each of the plurality of transceivers is configured to operate asynchronously and simultaneously with other transceivers of the plurality of transceivers.

In another aspect, a method for communication is provided that includes simultaneously and asynchronously processing a plurality of spatial streams using a plurality of transceivers.

In yet another aspect, an apparatus for communication is provided that includes means for simultaneously processing a plurality of spatial streams using a plurality of transceivers; and means for asynchronously processing the plurality of spatial streams using the plurality of transceivers.

In yet another aspect, a computer-program product for communication is provided that includes a machine-readable medium encoded with instructions executable to process a plurality of spatial streams asynchronously and simultaneously.

In yet another aspect, an access point is provided that includes a wireless network adapter configured to support a backhaul connection for a peer node to a network; and a plurality of transceivers arranged to process a plurality of spatial streams, wherein each of the plurality of transceivers is configured to operate asynchronously to and simultaneously with the other plurality of transceivers To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

These and other sample aspects of the invention will be described in the detailed description that follow, and in the accompanying drawings, wherein

FIG. 4 is a diagram showing a 5 GHz Spectrum plan;

Figure 1:
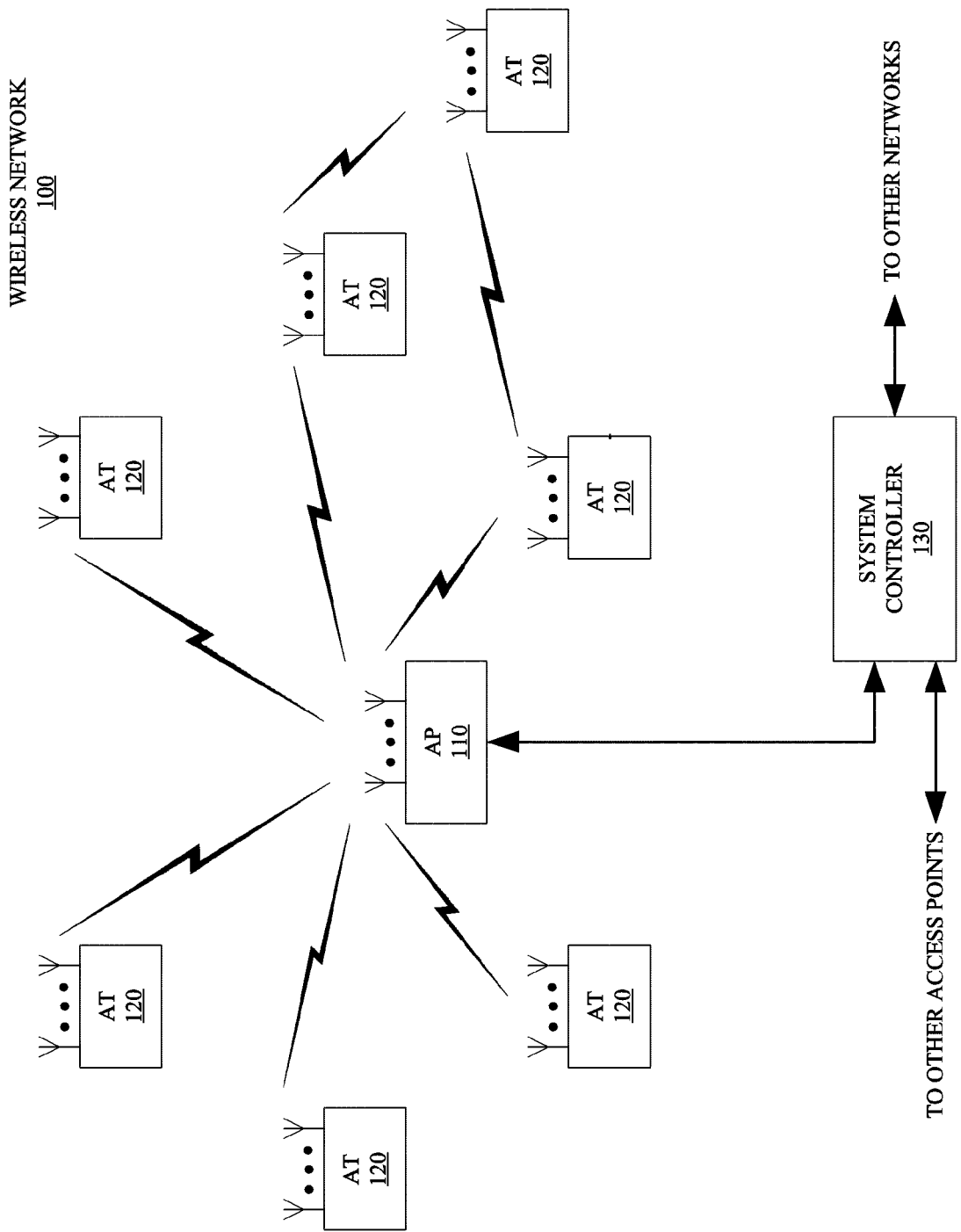
FIG. 1 is a diagram of a wireless communications network.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the invention are described more fully hereinafter with reference to the accompanying drawings.

This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein one skilled in the art should appreciate that that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Several aspects of a wireless network will now be presented with reference to FIG. 1. The wireless network 100 is shown with several wireless nodes, generally designated as nodes 110 and 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, the access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream.

One or more access terminals 120 may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention is not limited to any particular wireless technology and/or air interface standard.

According to one aspect, a multi-channel architecture is presented that allows asynchronous transmission of data on multiple-Very High Throughput (VHT) channels. A VHT channel is defined herein a set of adjacent 20 MHz channels. In one aspect, the VHT channel can consist of one 20 MHz channel. In another aspect, a VHT channel can be 100 MHz wide and consist of 5 adjacent 20 MHz channels. The multi-channel architecture circumvents the de-sensing of channels in a receive mode caused by transmission on channels in a transmit mode. The multi-channel architecture leads to a substantial increase in throughput. Typically, the number of VHT channels supported by the access point 110 can be larger than the number of VHT channels support by an access terminal, to keep the cost/complexity of the system low. In one aspect, only the access point 110 supports multiple VHT channels, whereas the access terminals 120 supports only one VHT channel, from the set of VHT channels supported by the access point 110. Such a system configuration reduces the cost/complexity at the access terminals 120. The access point 110 may instruct the access terminals 120 to move to a new VHT channel to improve successful data transmission probability and benefit from light system loading in the new channel. The access terminals 120 may also dynamically elect to move to a new VHT channel to improve data transmission probability and benefit from light system loading in the new channel, or to minimize de-sense and aliasing from another VHT channel.

The details of the access point 110 are shown in the following figures and description. As shown, the access point 110 transmits/receives on multiple VHT channels in an asynchronous fashion. In one aspect, this is enabled using multiple Bulk Acoustic Wave (BAW) filters, analog RF filters and antenna spacing between different VHT channels.

Figure 2:
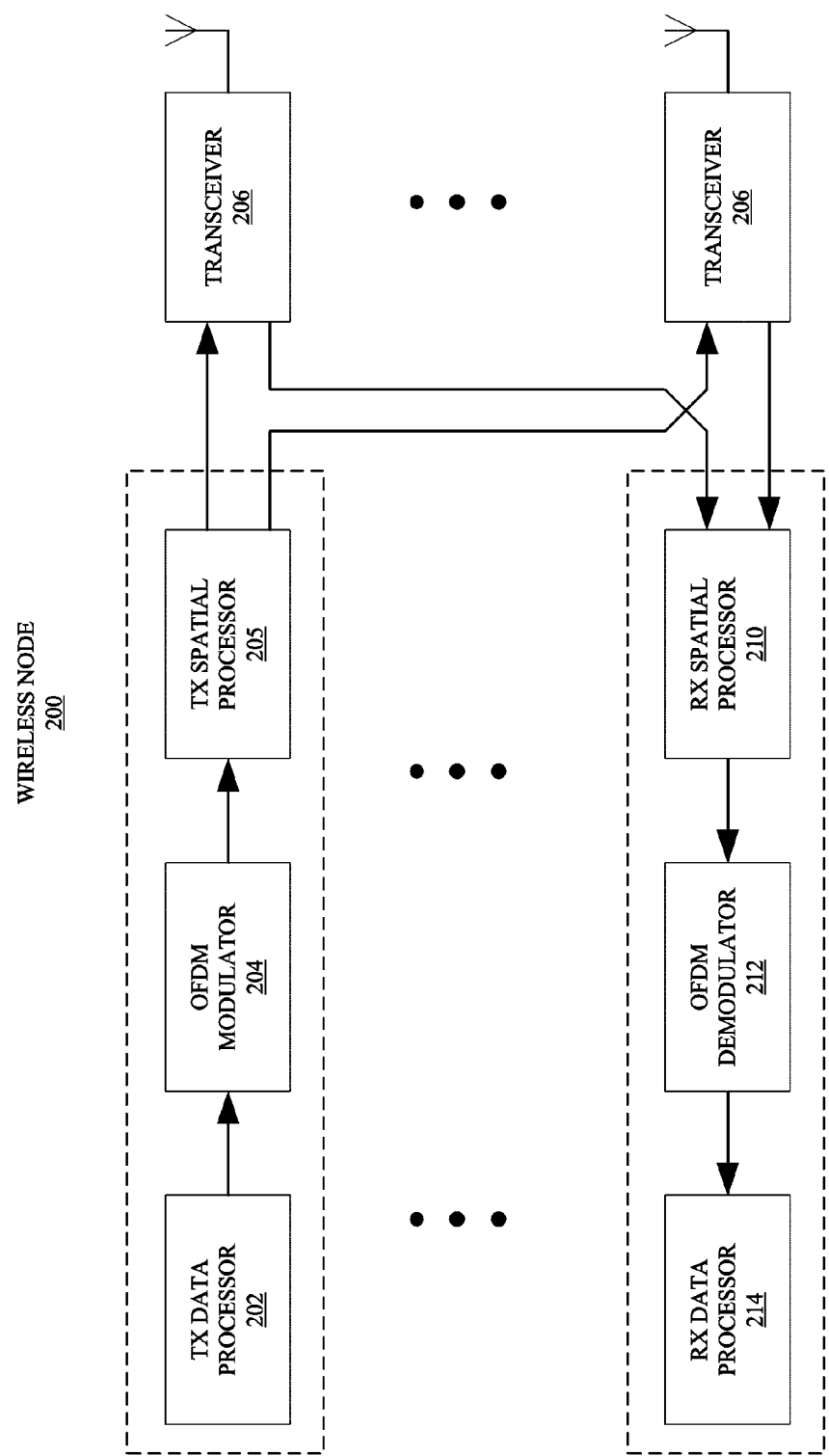
FIG. 2 is a wireless node that includes a front end processing system in a wireless node in the wireless communications network of FIG. 1.

FIG. 2 is a conceptual block diagram illustrating an example of the signal processing functions of the PHY layer. In a transmit mode, a TX data processor 202 may be used to receive data from the MAC layer and encode (e.g., Turbo code) the data to facilitate forward error correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator splits the modulation symbols into parallel streams. Each stream is then mapped to an OFDM subcarrier and then combined together using an Inverse Fast Fourier Transform (IFFT) to produce a time domain OFDM stream.

A TX spatial processor 206 performs spatial processing on the OFDM stream. This may be accomplished by spatially precoding each OFDM and then providing each spatially precoded stream to a different antenna 208 via a transceiver 206. Each transmitter 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 210.

In wireless nodes implementing OFDM, the stream (or combined stream) from the RX spatial processor 210 is provided to an OFDM demodulator 212. The OFDM demodulator 212 converts the stream (or combined stream) from time-domain to the frequency domain using a Fast Fourier Transform (FFT). The frequency domain signal comprises a separate stream for each subcarrier of the OFDM signal. The OFDM demodulator 212 recovers the data (i.e., modulation symbols) carried on each subcarrier and multiplexes the data into a stream of modulation symbols.

A RX data processor 214 may be used to translate the modulation symbols back to the correct point in the signal constellation. Because of noise and other disturbances in the wireless channel, the modulation symbols may not correspond to an exact location of a point in the original signal constellation. The RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs in order to decode the data that was originally transmitted before providing the data to the MAC layer.

Figure 3:
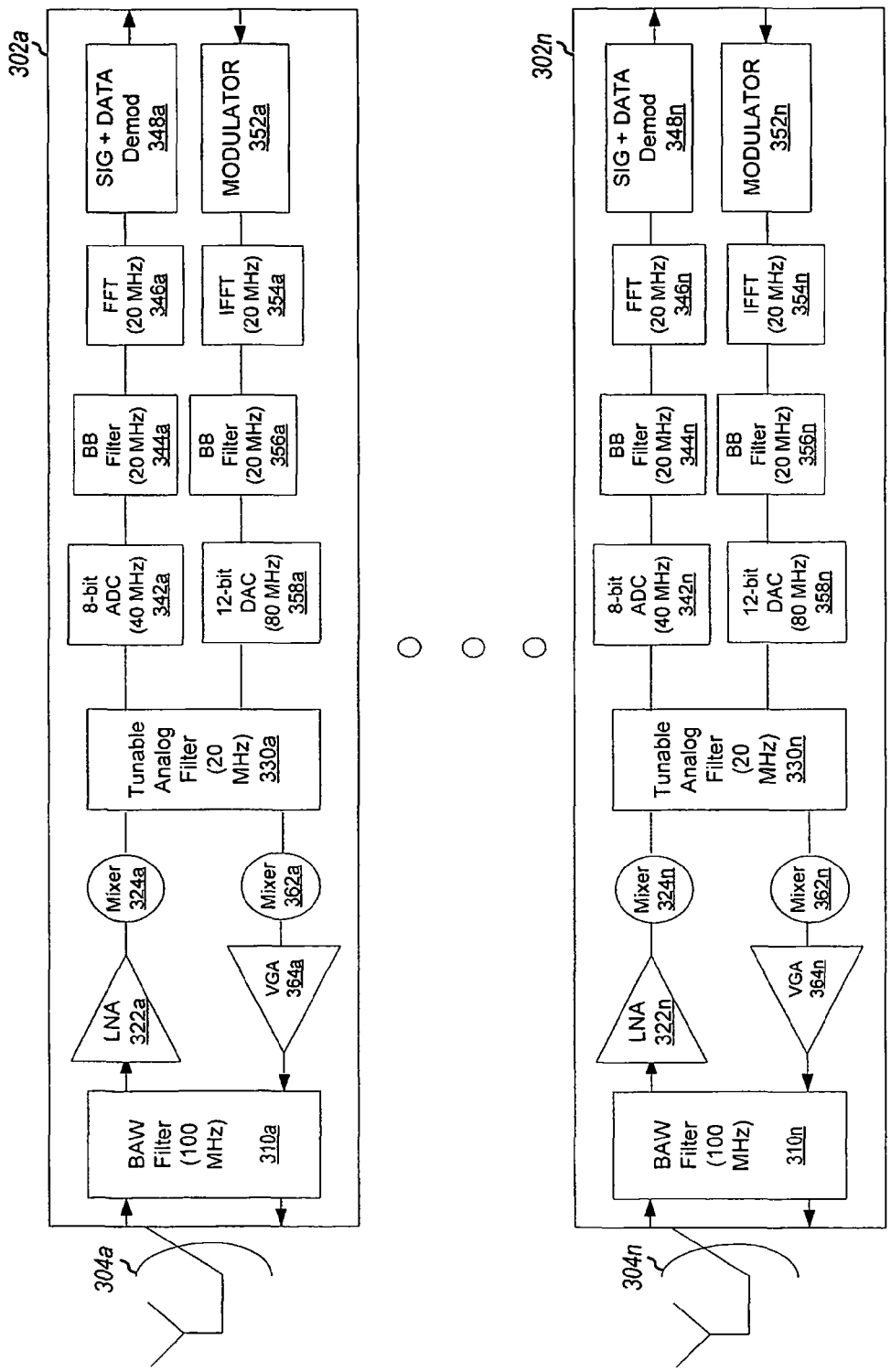
FIG. 3 is a block diagram illustrating an example of a hardware configuration for the front end processing system of FIG. 2.

FIG. 3 is a conceptual block diagram illustrating an example of the signal processing functions of a front end architecture 300 for an access point such as the accept point 110, the architecture 300 including a plurality of channel modules 302a-n. The components of the channel module 302a will be used to describe the function and operation of all the channel modules 302a-302n. As shown, the channel module 302a includes a receive side and a transmit side.

On the receive side, a bulk acoustic wave (BAW) filter 310a filters a signal received from an antenna 304a. As each of the VHT channels requires isolation, each VHT channel may be provided by a separate antenna 304a-n. In one aspect, each antenna 304a-n is separated from each other by 2-10 lambda of spacing, or more depending on the physical configuration of the access point 110. This provides approximately 20 dB of isolation. In addition, the antennas 304a-n may have different polarizations to provide further isolation between the antennas 304a-n.

The filtered signal from the BAW filter 310a is then provided to a low noise amplifier (LNA) 322a. The LNA 322a amplifies the signals captured by the antenna 304a and filtered by the BAW filter 310a. The LNA 322a is placed at the front portion of the receive side of the front end architecture 300 as the overall noise figure of the receive side is significantly affected by the first few stages of processing. Using the LNA 322a, the noise of all subsequent stages of the receive side of the front end architecture 300 is reduced by the gain of the LNA 322a. However, any noise caused by the LNA 322a will be injected directly into the received signal. Thus, it is preferable that the LNA 322a to boost the desired signal power while adding as little noise and distortion as possible so that the retrieval of this signal is possible in the later stages in the system.

A mixer 324a receives the signal from the LNA 322a. The purpose of the mixer is to down-convert the RF signal to a IF or baseband signal, before sending it to a tunable analog filter 330a. The tunable analog filter 330a filters out unwanted signals and allows selected frequencies and signals to pass. The filter can be "tuned" to one or more adjacent 20 MHz channels to accommodate the VHT channel bandwidth. Each tunable analog filter 330a-n may then be use to filter for a particular channel.

An analog-to-digital converter (ADC) 342a receives the signal, filtered from tunable analog filter 330a, and converts the analog signal to a digital signal. The ADC 342a samples the analog signal with a sampling rate that is at least twice the bandwidth of the tunable analog filter 330a with a sampling of 8-bits. The digital signal is then output to a digital baseband (BB) filter 344a.

The BB filter 344a filters the digital signal to extract the signal that is sent to a fast Fourier transform unit (FFT) 346a. The FFT 346a converts the signal from a time domain to a frequency domain, separating the signal into its magnitude and phase components, before sending it to a demodulator 348a.

The demodulator 348a will decode the signal to extract the data symbols (modulation symbols) to pass the stream of symbols for processing by a back end receiver data processor (not shown).

On the transmit side, a modulator 352a processes a data stream to create a stream of modulated symbols for an inverse fast Fourier transform unit (IFFT) 354a.

The IFFT 354a transforms the sequence of modulation symbols to a time domain stream that is sent to a baseband (BB) filter 356a.

The BB filter 356a receives the time domain stream and provides further noise rejection to ensure that the images are at least 15 dB below noise floor.

The digital-to-analog converter (DAC) 358a converts the digital signal, based on a 12-bit signal, into an analog signal to be sent to the tunable analog filter 330a.

After the signal has been filtered and sent to a mixer 362a, it is sent to a variable gain amplifier (VGA) 364a. The VGA 364a will provide a signal that is matched to the BAW filter 310a.

The BAW filter 310a then transmits the signal using the antenna 304a. The BAW filter 310a provides approximately 40 dB of isolation, and the tunable analog filter 330a provides approximately 50 dB of isolation.

The following describe the worse case computations for the front end architecture 300. Assuming the modem is transmitting on a channel A at +20 dBm and receiving a packet on a channel B @ −90 dBm (~0 dB SNR). And, assuming an antenna isolation of 20 dB and a BAW filter rejection of 40 dB, the image A is @ −40 dBm, and the receiver packet on the channel B is @ −90 dBm. Then, the image power should be in the linear range of the LNA and the mixer, i.e., no harmonics or non-linearities are created. The tunable analog filter provides another 50 dB of rejection, leading the image A power to be @ −90 dBm. With a 1-bit ADC additional overhead (9-bit ADC), 3 such image channels may be accommodated. The digital BB filter provides another 15 dB of rejection to ensure that the images are at least 15 dB below noise floor.

Additional architectural considerations are as follows. VHT channel bandwidths of 20n MHz, can be supported, where n=1, 2, 3, 4. The adjustable ADC sampling rate may be 40n MHz. Adjustable analog digital filter bandwidth may be 20n MHz, and adjustable FFT/IFFT bandwidths may be 20n MHz. Furthermore, BB processing for all channels can be on the same chip to reduce area. Independent ADC and DAC per channel may be used. Although, the RF processing for all channels may be on the same chip to reduce area, the processing may be performed on separate chips to improve isolation. There may be a shared local oscillation across all channels.

FIG. 4 illustrates a table 400 with a 5 GHz spectrum use plan. As shown, each station can use up to approximately 24 channels, each of which is 20 MHz wide. In this diagram, for each of the channels specified, a transmit frequency is shown. Channels 40-48 belong to U-NI lower band, and 52-64 belong to U-NI middle band, with approximately 12 channels in middle-upper band, and channels 149-161 are in U-NI upper band.

Requirements for a multichannel modem according to an aspect of the invention are as follows. The access point can asynchronously transmit and receive across multiple VHT channels simultaneously subject to the following caveats. A VHT channel can be either 20 MHz, 40 Mhz, 60 MHz, 80 MHz or 100 MHz-wide, and can switch between the these bandwidths using 802.11n protocol extensions, that specificies mechanisms to extend bandwidth from 20 MHz to 40 MHz. Each VHT channel has to be separated by ~80-100 MHz to guard against channel de-sensing. The exact bandwidth separation will be determined by the RF BAW filter cost and capabilities. A smaller bandwidth separation implies the modem can support larger number of channels.

The main reason for allowing asynchronous transmission/reception on multiple VHT channels for the AP is as follows. Restricting access point VHT channels to either all transmit or receive synchronously, may limit the Network Allocation Vector (NAV) monitoring capabilities on secondary VHT channels and subsequent throughput gains. This is because the modem would be deaf on secondary channel traffic while transmitting on primary channel. Note that the NAV is the indicator of time kept by each station when transmission onto the wireless medium cannot be initiated. The NAV information is derived by each station from the announcements by other stations of how long they intend to occupy the medium.

Figure 5:
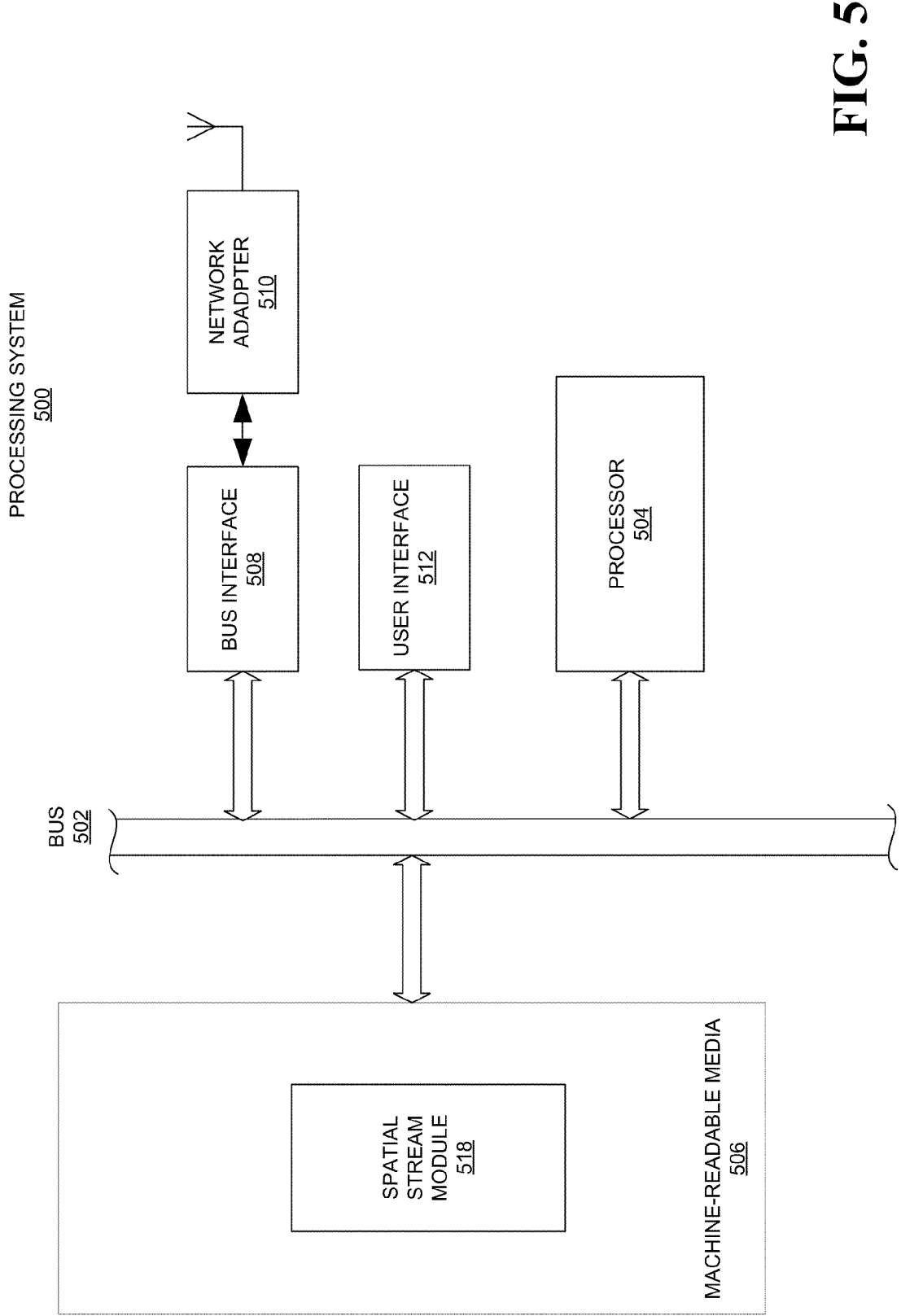
FIG. 5 is a block diagram illustrating an example of a hardware configuration for a processing system in a wireless node in the wireless communications network of FIG. 1; and, FIG. 6 is a block diagram illustrating an apparatus for processing a plurality of spatial streams.

FIG. 5 is a conceptual diagram illustrating an example of a hardware configuration for a processing system 500 in a wireless node. In this example, the processing system 500 may be implemented with a bus architecture represented generally by bus 502. The bus 502 may include any number of interconnecting buses and bridges depending on the specific application of the processing system 500 and the overall design constraints. The bus links together various circuits including a processor 504, machine-readable media 506, and a bus interface 508. The bus interface 508 may be used to connect a network adapter 510, among other things, to the processing system 500 via the bus 502. The network interface 510 may be used to implement the signal processing functions of the PHY layer. In the case of an access terminal 110 (see FIG. 1), a user interface 512 (e.g., keypad, display, mouse, joystick, etc.) may also be connected to the bus. The bus 502 may also link various other circuits such as timing sources, peripherals, voltage regulators, power management circuits, and the like, which are well known in the art, and therefore, will not be described any further.

The processor 504 is responsible for managing the bus and general processing, including the execution of software stored on the machine-readable media 508. The processor 508 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable may be embodied in a computer-program product. The computer-program product may comprise packaging materials.

In the hardware implementation illustrated in FIG. 5, the machine-readable media 506 is shown as part of the processing system 500 separate from the processor 504. However, as those skilled in the art will readily appreciate, the machine-readable media 506, or any portion thereof, may be external to the processing system 500. By way of example, the machine-readable media 506 may include a transmission line, a carrier wave modulated by data, and/or a computer product separate from the wireless node, all which may be accessed by the processor 504 through the bus interface 508. Alternatively, or in addition to, the machine readable media 504, or any portion thereof, may be integrated into the processor 504, such as the case may be with cache and/or general register files.

The processing system 500 may be configured as a general-purpose processing system with one or more microprocessors providing the processor functionality and external memory providing at least a portion of the machine-readable media 506, all linked together with other supporting circuitry through an external bus architecture. Alternatively, the processing system 500 may be implemented with an ASIC (Application Specific Integrated Circuit) with the processor 504, the bus interface 508, the user interface 512 in the case of an access terminal), supporting circuitry (not shown), and at least a portion of the machine-readable media 506 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 500 depending on the particular application and the overall design constraints imposed on the overall system.

The machine-readable media 506 is shown with a number of software modules. The software modules include instructions that when executed by the processor 504 cause the processing system 500 to perform various functions. Each software module may reside in a single storage device or distributed across multiple storage devices. By way of example, a software module may be loaded into RAM from a hard drive when a triggering event occurs. During execution of the software module, the processor 504 may load some of the instructions into cache to increase access speed. One or more cache lines may then be loaded into a general register file for execution by the processor 504. When referring to the functionality of a software module below, it will be understood that such functionality is implemented by the processor 504 when executing instructions from that software module. In one aspect, a module 518 for processing a plurality of spatial streams simultaneously is provided. The module 518 is also able to process the streams asynchronously in one aspect.

Figure 6:
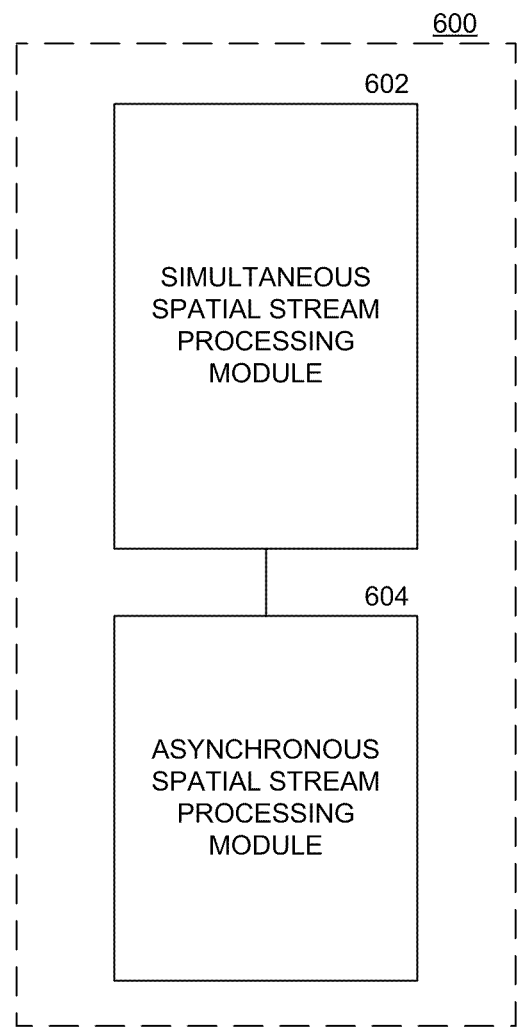

FIG. 6 is a block diagram illustrating an exemplary apparatus 600 for wireless communications having various modules operable to process spatial streams. A simultaneous spatial stream processing module 602 is used for processing a plurality of spatial streams using a plurality of transceivers. An asynchronous spatial stream processing module 604 can asynchronously process the plurality of spatial streams using the plurality of transceivers.

It is understood that any specific order or hierarchy of steps described in the context of a software module is being presented to provide an examples of a wireless node. Based upon design preferences, it is understood that the specific order or hierarchy of steps may be rearranged while remaining within the scope of the invention.

Although various aspects of the present invention have been described as software implementations, those skilled in the art will readily appreciate that the various software modules presented throughout this disclosure may be implemented in hardware, or any combination of software and hardware. Whether these aspects are implemented in hardware or software depends upon the particular application and design constraints imposed on the overall system. Skilled artisans may implement the described functionality in varying ways for each particular application, but such implementation decisions should not be interpreted as causing a departure from the scope of the invention.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communications, comprising:
    a plurality of transceivers arranged to process a plurality of spatial streams, wherein each of the plurality of transceivers is configured to operate asynchronously and simultaneously with other transceivers of the plurality of transceivers, and to support a different access protocol than at least one other transceiver,
    wherein a channel bandwidth of each of the plurality of transceivers is independently adjustable, a first subset of one or more of the plurality of transceivers are in a receiver mode, and a second subset of one or more of the plurality of transceivers are in a transmit mode at any given instant of time.

2. The apparatus of claim 1 wherein each of the plurality of transceivers is further configured to support a different frequency channel than at least one other transceiver.

3. The apparatus of claim 1 wherein the plurality of transceivers support a plurality of frequency channels for an access point to support an access terminal comprising only one transceiver communicating on one of the frequency channels supported by the access point.

4. The apparatus of claim 3 wherein the access terminal may autonomously switch to any frequency channel supported by the access point.

5. The apparatus of claim 3 wherein the access point may switch the access terminal to communicate on any frequency channel supported by the access point.

6. The apparatus of claim 1 wherein the plurality of transceivers are further configured to process the plurality of spatial streams for communicating with a plurality of nodes.

7. The apparatus of claim 1 wherein the plurality of transceivers comprises at least two antennas.

8. The apparatus of claim 7, wherein each antenna in the at least two antennas has a different polarization or beam pattern.

9. The apparatus of claim 7 wherein each of the plurality of transceivers further comprises an amplifier and a bandpass filter between the amplifier and its respective antenna.

10. The apparatus of claim 9 wherein each bandpass filter comprises a bulk acoustic wave filter.

11. The apparatus of claim 9 wherein each of the plurality of transceivers comprises a receiver having the amplifier and the bandpass filter, wherein the amplifier comprises a low noise amplifier.

12. The apparatus of claim 9 wherein each of the plurality of transceivers comprises a transmitter having the amplifier and the bandpass filter, wherein the amplifier comprises a variable gain amplifier.

13. The apparatus of claim 1 wherein each of the plurality of transceivers comprises a mixer that is independently tunable from at least one other mixer.

14. The apparatus of claim 1 wherein each of the plurality of transceivers comprises a receiver having a FFT and a transmitter having an IFFT.

15. The apparatus of claim 1 wherein each of the plurality transceivers comprises a receiver comprising a filter that is independently tunable from at least one other filter.

16. The apparatus of claim 15 wherein the filter comprises an analog filter.

17. The apparatus of claim 15 wherein the filter comprises a digital filter.

18. A method for communication, comprising:
simultaneously and asynchronously processing a plurality of spatial streams using a plurality of transceivers,
wherein each of the plurality of transceivers supports a different access protocol than at least one other transceiver, a channel bandwidth of each of the plurality of transceivers is independently adjustable, a first subset of one or more of the plurality of transceivers is in a receiver mode, and a second subset of one or more of the plurality of transceivers is in a transmit mode at any given instant of time.

19. The method of claim 18 further comprising each of the plurality of transceivers supporting a different frequency channel than at least one other transceiver.

20. The method of claim 18 wherein the plurality of transceivers support a plurality of frequency channels for an access point to support an access terminal comprising only one transceiver communicating on one of the frequency channels supported by the access point.

21. The method of claim 20 wherein the access terminal may autonomously switch to any frequency channel supported by the access point.

22. The method of claim 20 wherein the access point may switch the access terminal to communicate on any frequency channel supported by the access point.

23. The method of claim 18 further comprising processing the plurality of spatial streams for communicating with a plurality of nodes.

24. The method of claim 18 wherein the processing comprises employing at least two separate antennas.

25. The method of claim 24, wherein each antenna in the at least two separate antennas has a different polarization or beam pattern.

26. The method of claim 24 wherein the processing further comprises amplifying and bandpass filtering.

27. The method of claim 26 wherein the bandpass filtering comprises a bulk acoustic wave filtering.

28. The method of claim 26 wherein the processing comprises receiving with amplifying and bandpass filtering, wherein the amplifying comprises low noise amplifying.

29. The method of claim 26 wherein the processing comprises transmitting with amplifying and bandpass filtering, wherein the amplifying comprises variable gain amplifying.

30. The method of claim 18 wherein the processing comprises independently tunable mixing.

31. The method of claim 18 wherein the processing comprises receiving using a FFT and transmitting using an IFFT.

32. The method of claim 18 wherein the processing comprises receiving with independently tunable filtering.

33. The method of claim 32 wherein the filtering comprises analog filtering.

34. The method of claim 32 wherein the filtering comprises digital filtering.

35. An apparatus for communication, comprising:
means for simultaneously processing a plurality of spatial streams using a plurality of transceivers;
means for asynchronously processing the plurality of spatial streams using the plurality of transceivers; and
means for each of the plurality of transceivers to support a different access protocol than at least one other transceiver;
wherein a channel bandwidth of each of the plurality of transceivers is independently adjustable, a first subset of one or more of the plurality of transceivers is in a receiver mode, and a second subset of one or more of the plurality of transceivers is in a transmit mode at any given instant of time.

36. The apparatus of claim 35 wherein each of the plurality of transceivers supports a different frequency channel than at least one other transceiver.

37. The apparatus of claim 35 wherein the plurality of transceivers support a plurality of frequency channels for an access point to support an access terminal comprising only one transceiver communicating on one of the frequency channels supported by the access point.

38. The apparatus of claim 37 wherein the access terminal may autonomously switch to any frequency channel supported by the access point.

39. The apparatus of claim 37 wherein the access point may switch the access terminal to communicate on any frequency channel supported by the access point.

40. The apparatus of claim 35 wherein at least one of the means for simultaneously processing and the means for asynchronously processing further comprises means for amplifying and means for bandpass filtering.

41. The apparatus of claim 35 further comprising means for processing the plurality of spatial streams for communicating with a plurality of nodes.

42. The apparatus of claim 35 wherein a channel bandwidth of each of the plurality of transceivers is independently adjustable.

43. The apparatus of claim 35 wherein at least one of the means for simultaneously processing and the means for asynchronously processing comprises means for employing at least two separate antennas.

44. The apparatus of claim 43 wherein at least one of the means for simultaneously processing and the means for asynchronously processing using each of the plurality of transceivers further comprises means for amplifying and means for bandpass filtering.

45. The apparatus of claim 44 wherein the means for bandpass filtering comprises means for bulk acoustic wave filtering.

46. The apparatus of claim 44 wherein the at least one of the means for simultaneously processing and the means for asynchronously processing comprises means for receiving with amplifying means and bandpass filtering means, wherein the amplifying means comprises low noise amplifying means.

47. The apparatus of claim 44 wherein the at least one of the means for simultaneously processing and the means for asynchronously processing comprises means for transmitting with amplifying means and bandpass filtering means, wherein the amplifying means comprises variable gain amplifying means.

48. The apparatus of claim 43, wherein each antenna in the at least two separate antennas has a different polarization or beam pattern.

49. The apparatus of claim 35 wherein at least one of the means for simultaneously processing and the means for asynchronously processing comprises means for independently tunable mixing.

50. The apparatus of claim 35 wherein at least one of the means for simultaneously processing and the means for asynchronously processing comprises receiving means comprising means for performing an FFT and transmitting means comprising means for performing an IFFT.

51. The apparatus of claim 35 wherein at least one of the means for simultaneously processing and the means for asynchronously processing comprises means for receiving comprising independently tunable filtering means.

52. The apparatus of claim 51 wherein the filtering means comprises analog filtering means.

53. The apparatus of claim 51 wherein the filtering means comprises digital filtering means.

54. A computer-program product for communication, comprising:
a non-transitory machine-readable medium encoded with instructions executable to:
process a plurality of spatial streams asynchronously and simultaneously using a plurality of transceivers, wherein each of the plurality of transceivers supports a different access protocol than at least one other transceiver, a channel bandwidth of each of the plurality of transceivers is independently adjustable, a first subset of one or more of the plurality of transceivers is in a receiver mode, and a second subset of one or more of the plurality of transceivers is in a transmit mode at any given instant of time.

55. An access point, comprising:
a wireless network adapter configured to support a backhaul connection for a peer node to a network; and
a plurality of transceivers arranged to process a plurality of spatial streams, wherein each of the plurality of transceivers is configured to operate asynchronously to and simultaneously with the other transceivers in the plurality of transceivers, and to support a different access protocol than at least one other transceiver,
wherein a channel bandwidth of each of the plurality of transceivers is independently adjustable, a first subset of one or more of the plurality of transceivers is in a receiver mode and a second subset of one or more of the plurality of transceivers is in a transmit mode at any given instant of time.

* * * * *